Patented Jan. 19, 1954

2,666,777

UNITED STATES PATENT OFFICE 2,666,777

PROPYL p-NITROPHENYL THIONOBENZENEPHOSPHONATES

Arthur G. Jelinek, Wilmington, Del., assignor to E. I. du Pont de Nemours and Company, Wilmington, Del., a corporation of Delaware No Drawing. Application March 8, 1950,
Serial No. 148,499

3 Claims. (Cl. 260—461)

This invention relates to two compounds, namely, the normal propyl and the isopropyl para - nitrophenyl thionobenzenephosphonates. More specifically, the invention relates to compositions and methods employing those thionobenzenephosphonates for the control of aphides.

The propyl para-nitrophenyl thionobenzenephosphonates of the invention are represented by the formula (1) 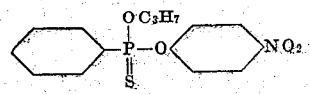

where the propyl radical $C_3H_7-$ is n-propyl or isopropyl.

The propyl para-nitrophenyl thionobenzenephosphonates of the invention are prepared by a two-step process. In the first step, a sodium propionate is reacted with thionobenzenephosphonyl dichloride to give a chlorophenylpropoxyphosphine sulfide. In the second step, chlorophenylpropoxyphosphine sulfide is reacted with sodium para-nitrophenate to give the product. The reactions are:

(2) 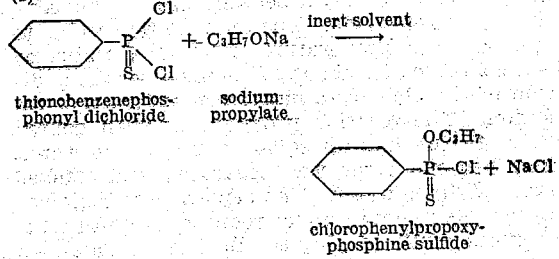

(3) 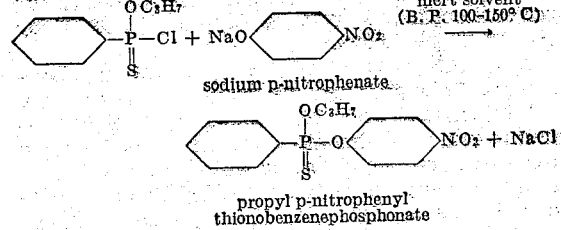

The first step of the reaction, as illustrated in Equation 2 proceeds readily at room temperature. Instead of using sodium propylate as a reactant, normal propanol or isopropanol may be used. If a propanol is used instead of sodium propylate then a hydrogen chloride acceptor, such as pyridine, is also used in the reaction.

The reaction of Equation 2 is suitably effected in the presence of an inert solvent, such as benzene or chlorobenzene.

The reaction illustrated in Equation 3 is preferably carried out at an elevated temperature, say 100 to 150° C., in the presence of an inert solvent. Chlorobenzene is particularly suitable as a solvent because of its convenient boiling point since the reaction can be carried out at atmospheric pressure, in the presence of chlorobenzene by refluxing at a temperature of about 130° C.

The propyl para-nitrophenyl thionobenzenephosphonates of the invention are recovered from the reaction mass of Equation 3 by filtering off the insoluble sodium chloride and distilling off the solvents.

The propyl para-nitrophenyl thionobenzenephosphonates of the invention, prepared according to the steps illustrated above, are oily liquids, having a light yellow color and are obtained in good yield. While the product so obtained is not highly refined, analysis of it conforms closely to the calculated value. Further refinement of the product is difficult because it is not easily distilled, nor is crystallization readily induced by cooling.

The propyl para-nitrophenyl thionobenzenephosphonates are effective as toxicants for the control of aphids. They are particularly well-suited for use in agriculture for applying to growing crops for the control of aphids.

The aphicidal compositions of the invention are prepared by admixing the propyl para-nitrophenyl thionobenzenephosphonates of the invention with suitable insecticidal adjuvants to provide compositions in the form of solutions, dusts, water-dispersible powders, and aqueous dispersions or emulsions.

By the term "insecticidal adjuvant," I mean a substance which is capable of presenting or aiding in the presentation of an insect toxicant to an insect. The term "adjuvant" is well established in the art where it is recognized that an active agent or toxicant is in itself of little practical utility for combatting insects unless it be presented in a form suitable for effecting intimate contact of the agent or its vapors, as the particular case may require, with the insect. Thus additional material or materials are employed in the formulation of an active agent to yield a suitable insecticidal composition, such materials being adjuvants.

Insecticidal adjuvants such as the dusts, solvents, wetting, dispersing and emulsifying agents set out in the United States Patent 2,426,417 may be employed in the preparation of the insecticidal compositions of the present invention. Other wetting, dispersing, and emulsifying agents, such as those listed in detail in Bulletin E-607 of the Bureau of Entomology and Plant Quarantine of the U. S. Department of Agriculture and such as those set out in an article by McCutcheon in Chemical Industries, November 1947, page 811 entitled "Synthetic Detergents," may also be used.

Preferably the compositions of the invention are in the form of "concentrates" suitable for dispersion in water to give aqueous spray compositions. A suitable emulsifiable oil concentrate is obtained, for example, by adding a dispersing or emulsifying agent to a propyl para-nitrophenyl thionobenzenephosphonate of the invention. Preferably the dispersing or emulsifying agent is one which is soluble in the compound and ordinarily the agent will not comprise more than 10% by weight of the emulsifiable oil composition and with the better adjuvant materials, the percentage will be 5% or less.

Less concentrated emulsifiable oil concentrates are prepared by dissolving a propyl para-nitrophenyl thionobenzenephosphonate of the invention and a wetting, dispersing, and emulsifying agent in a suitable solvent. Care should be taken, however, in the selection of a solvent if the composition is to be applied to foliage since, as those skilled in the insecticide art know, many of the common solvents tend to injure plants.

Dust compositions of the invention contain a propyl para-nitrophenyl thionobenzenephosphonate of the invention adsorbed on finely divided carriers or dusts such as talc, pyrophyllite, natural clays, diatomaceous earths, and other powdered diluents such as those set out in the aforementioned U. S. patent.

The dust compositions of the invention are prepared by mixing intimately the liquid propyl para-nitrophenyl thionobenzenephosphonates of the invention with the powdered carrier. Alternatively, the toxic compound may be dissolved in a volatile solvent such as acetone and the solution thus obtained then mixed with the powdered carried and the solvent subsequently removed from the composition by evaporation.

The maximum concentration of the toxicant in the dust composition or water-dispersible powder will, of course, vary with the adsorptivity of the particular powdered diluent used. For example, if fuller's earth is used, the dust may contain as much as about 40% of the liquid toxicant. Using a less adsorptive diluent such as pyrophyllite, however, it is necessary to reduce the content of the liquid toxicant appreciably in order to obtain a free-flowing powdered insecticidal composition.

Preferred water-dispersible powders of the invention contain in the order of about 35% by weight of a propyl para-nitrophenyl thionobenzenephosphonate of the invention dispersed on a highly adsorbent powdered diluent such as fuller's earth or diatomaceous earth. Such water-dispersible powders also contain an effective amount of a dispersing or emulsifying agent. Bentonite is well-suited as a dispersing agent for this purpose.

In actual application of the compositions for aphid control, it is generally preferred that the toxicant be present in relatively low concentrations. For example, if application of the composition is to be made to vegetation or agricultural crops, the emulsifiable oil concentrate or water-dispersible powdered compositions described above are preferably dispersed in water to obtain aqueous suspensions or emulsions of suitable concentration.

In applying the compounds of the invention for the control of aphids they are, of course, applied in amount sufficient to exert an aphicidal action. In normal usage, such as in applications of the compositions to agricultural crops for the control of aphids, the toxicant is suitably applied at a concentration of from 0.005 to about 1.0%. More preferably, if the treatment is made for the control of aphids by spraying an aqueous emulsion of an emulsifiable oil concentrate or an aqueous dispersion of a concentrated water-dispersible powder of the type previously described, the concentration of the toxicant in the spray composition is from about 0.005 to 0.05%.

The toxicant is applied either as a spray or a dust to the locus or area to be protected. Such application may be made directly upon the locus or area or the aphids thereon during the period of infestation or alternatively, the material may be otherwise applied so that the aphids will come into contact with the toxic residue and be killed.

The compositions of the invention may include fungicides such as zinc dimethyl dithiocarbamate, zinc ethylene bis-dithiocarbamate, and manganese ethylene bis-dithiocarbamate; insecticides such as DDT, 2,2-bis-(paramethoxyphenyl)-1,1,1-trichloroethane (methoxychlor), and 1,2,4,5,6,7,8,8-octachloro-4,7-methane-3a,4,7,7a-tetrahydroindane (chlordane); and other fungicides and insecticides such as those set out in U. S. Patent 2,426,417.

The invention is illustrated by the following examples:

EXAMPLE I

*n-Propyl para-nitrophenyl thionobenzenephosphonate*

15 parts by weight n-propanol was gradually added over a period of about one hour to a mixture of 52.8 parts by weight thionobenzenephosphonyl dichloride, 19.8 parts by weight pyridine, and 88 parts by weight benzene, while maintaining vigorous stirring. The mixture was cooled to maintain the temperature of 25–30° C.; stirring was continued for about two hours after the addition of the alcohol to insure completeness of reaction. The reaction product was then poured with stirring into an equal volume of ice water. The benzene layer was separated and washed twice with ice water. The benzene and dissolved water was removed under reduced pressure (c. a. 25 mm.) while keeping the product residue at a temperature below about 50° C. to avoid possible decomposition. The product, chlorophenylpropoxyphosphine sulfide, weighed 45 parts by weight, $n_D^{25}=1.5628$.

A mixture of 35.4 parts by weight of the above intermediate product, 83 parts by weight dry chlorobenzene and 24.2 parts by weight sodium para-nitrophenate was stirred and refluxed for about four hours, after which time the reaction was complete as evidenced by the disappearance of the reddish color of the phenate. Finely suspended sodium chloride which had formed in the reaction was removed by filtration. Chlorobenzene was distilled off at a pressure of about 25 mm. absolute, leaving 40 parts by weight of the product n-propyl para-nitrophenyl thionobenzenephosphonate, $n_D^{26.5}=1.5926$.

*Anal.*—Calcd. for $C_{15}H_{16}NO_4PS$: S, 9.5. Found: S, 9.5, 9.53.

EXAMPLE II

*Isopropyl para-nitrophenyl thionobenzenephosphonate*

The reaction for the preparation of the intermediate chlorophenylisopropoxyphosphine sulfide was carried out following the same general procedure used for the preparation of the intermediate in Example I except that isopropanol was used instead of n-propanol, 48 parts by weight of the intermediate, a liquid product was obtained $n_D^{25}=1.5618$.

The reaction of the isopropyl intermediate with sodium para-nitrophenate was carried out following the general process of Example I. The reaction required from five to six hours rather than the four hours required in the case of the n-propyl isomer. 37 parts by weight of the product isopropyl para-nitrophenyl thionobenzenephosphonate was obtained. It is an amber colored liquid, $n_D^{26}=1.5964$.

*Anal.*—Calcd. for $C_{15}H_{16}NO_4PS$: S, 9.5. Found: 9.49, 9.56.

EXAMPLE III

*Aphicidal emulsifiable oil concentrate* n-Propyl para-nitrophenyl thionobenzenephosphonate prepared according to Example I is admixed with 5% by weight of a proprietary wetting, dispersing and emulsifying agent having as its effective ingredient, diethylcyclohexylamine dodecyl sulfate.

The emulsifiable oil concentrate of this example is readily dispersible in water to obtain aqueous spray compositions which are highly effective in the application to growing crops for the control of aphids.

A spray composition suitable for application to fruit trees for the control of aphids is obtained by dispersing the composition of this example in water in the proportions of about four ounces of the composition per 100 gallons of water.

EXAMPLE IV

*Water-dispersible aphicidal powder*

A water-dispersible aphicidal powder is obtained by admixing isopropyl para-nitrophenyl thionobenzene-phosphonate prepared as in Example II with finely divided fuller's earth and finely divided bentonite in the following proportions by weight:

|  | Percent |
|---|---|
| Isopropyl para-nitrophenyl thionobenzene-phosphonate | 35 |
| Bentonite | 5 |
| Fuller's earth | 60 |

The water-dispersible powdered composition of this example is free-flowing and is easily dispersed in water to give a relatively stable suspension in an aqueous spray composition. An excellent spray composition suitable for application to fruit trees for the control of aphids is obtained by the dispersion of the composition of this example in water in the proportions of twelve ounces of the composition per 100 gallons of water.

EXAMPLE V

*Aphicidal dust compositions*

An aphicidal dust is prepared by admixing the 35% n-propyl para-nitrophenyl thionobenzene-phosphonate composition prepared according to Example IV with talc in the proportions of about 16 parts by weight of talc for each part by weight of the 35% thionobenzenephosphonate composition.

The dust composition of this example is free-flowing and is easily broadcast over an area to be protected from infestation by aphids.

I claim:
1. A propyl para-nitrophenyl thionobenzenephosphonate.
2. n-Propyl para-nitrophenyl thionobenzenephosphonate.
3. Isopropyl para-nitrophenyl thionobenzenephosphonate.

ARTHUR G. JELINEK.

References Cited in the file of this patent

UNITED STATES PATENTS

| Number | Name | Date |
|---|---|---|
| 2,503,390 | Jelinek | Apr. 11, 1950 |